UNITED STATES PATENT OFFICE.

LEE F. HAWLEY, OF RANDOLPH, NEW YORK.

PROCESS OF PRODUCING CREOSOTE FROM HARDWOOD-TAR OILS.

1,199,271.     Specification of Letters Patent.    Patented Sept. 26, 1916.

No Drawing.     Application filed June 8, 1916. Serial No. 102,515.   REISSUED

*To all whom it may concern:*

Be it known that I, LEE F. HAWLEY, a citizen of the United States, residing at Randolph, in the county of Cattaraugus and State of New York, have invented certain new and useful Improvements in Processes of Producing Cresote from Hardwood-Tar Oils, of which the following is a specification.

This invention relates to the production of "beech-wood creosote," U. S. P., from the tar-oils obtained by the distillation of hard-wood tar. It is preferable that these tar-oils should have a range of boiling points approximately between 195° and 235° C.

The process as usually carried out for the production of U. S. P. creosote from these oils consists in the treatment thereof with sufficient dilute caustic soda solution to dissolve all of the phenols present. The alkaline solution of the phenols is then separated so far as practicable from the remaining neutral oils, which generally float on top, and boiled in order to distil over the remaining neutral oils. The alkaline solution is then neutralized and precipitated with sulfuric acid, and the precipitated oil distilled until only a thick pitchy material remains. The distilled oil thus obtained is again extracted with dilute caustic and the same process repeated. Usually about three complete stages, each comprising the steps of extraction, precipitation and distillation, are required to give a commercial product. It has been found, however, that only by modifying this general process in certain respects can the refined product be made standard in color and gravity, and such is the object of the present invention.

It has been found that the phenols which are most readily dissolved in caustic soda are those most desirable in the finished product, especially in regard to gravity. If in every extraction the phenols are completely or nearly completely dissolved, as is customary, the final product will have a gravity lower than that required by the U. S. P. If, however, in the first extraction of the crude tar-oils only from two-fifths to one-half of the phenols are extracted, the gravity of the final product will be sufficiently high. It has also been discovered that by blowing a stream of air constantly through the alkaline solution during distillation, not only is the solution prevented from dangerous bumping, but an oxidation also takes place which gives a product of lighter color when the solution is precipitated and the oils distilled. According to the present invention, therefore, the wood-oils having a range of boiling points approximately between 195° and 235° C., are treated with caustic soda solution in concentration and quantity sufficient to dissolve only a portion of the phenols contained in the tar-oil. The resulting solution is then distilled, and during the distillation air is blown through the solution to properly oxidize the same. The solution is thereupon cooled and neutralized with the proper amount of sulfuric acid. The oils precipitated upon neutralization are washed with water and distilled. During this distillation, as before, a constant stream of air is passed through the oils in the still to properly oxidize the product. This completes the first stage of treatment. The second and third stages are similar to the first, with the exception that the maximum distillation-temperatures are successively reduced and that smaller quantities of reagents are required.

The fractional extraction of the phenols is preferably practised in connection with the distillation of large amounts of wood-tar for the production of crude "creosote oil" containing approximately 80% of volatile materials between 100° and 275° C., and 20% of non-volatile pitch. A portion of the oils boiling between 195° and 235° C., is collected separately during the distillation of the tar, and this fraction is then treated with sufficient caustic soda to extract a certain portion of the phenols. The remaining phenols together with the neutral oils can then be returned to the rest of the distillate from the tar. Thus the oil desired as a starting-material for the process of the present invention may be obtained without materially affecting either the quality or quantity of the crude "creosote oil," and the undesirable by-products from the manufacture of beech-wood creosote, are reduced very considerably.

As illustrating the manner in which the process of the present invention may be carried out, the following example as applied to the treatment of one particular variety of tar-oil will be given, but it is to be understood that the conditions will perhaps vary somewhat in the treatment of other varieties of crude oil: 400 c. c. of the tar-oils, with boiling points between 195° and 235° C., are thoroughly shaken with 500 c. c. of caustic soda solution, of approximately 1.06 specific gravity. This amount and concentration of caustic soda is sufficient to dissolve only about two-fifths of the phenols contained in the tar-oil. About 270 c. c. of undissolved residue of phenols and neutral oils remain. The alkaline extract is then distilled. During this distillation air is constantly blown through the solution in the still, in order to properly oxidize the solution. Distillation is continued until about 250 c. c. of distillate has been obtained. This distillate is mostly water, but contains about 10 c. c. of neutral oil. The oxidized solution is then cooled and neutralized with the necessary amount of sulfuric acid. The oils precipitated upon neutralization, about 90 c. c., are washed with an equal amount of water and redistilled. During this distillation, as before, a constant stream of air is passed through the oils in the still to oxidize the product. The distilled oil obtained as a final product from the above-described first stage is then treated with caustic soda solution of the same concentration as that used in the first stage but enough is used to dissolve practically all of the phenols, in the specific example given about 280 c. c. The process is then continued just as in the first stage, except that smaller quantities of reagents are required. Three complete treatments or stages are usually necessary for the production of a standard "beech-wood creosote." The maximum temperatures of the distillations vary somewhat according to the stage of the process. In the first distillation, for instance, the maximum temperature should be approximately 235° C.; in the second distillation, the maximum temperature should be about 230° C.; while the maximum temperature of distillation during the third stage may be about 220° C. While it may not be impossible to effect the oxidation by the addition of chemicals, such as potassium bichromate or potassium permanganate, it has been found in the course of experimental work that the use of such chemicals is liable to decrease the gravity of the distillate below the desirable point. It is, therefore, inadvisable to use such chemicals unless the exact amount required is predetermined, and this is a difficult procedure; whereas in the use of a current of air, just the required amount of oxidation seems to be produced, however much air is blown through the mass. In the case of certain varieties of tar-oils which I have treated, it has been found as a result of this boiling and simultaneous treatment with an air blast, that a thick tarry material separates and settles to the bottom of the still. This tarry material when formed should, of course, be removed before acidification, to avoid impairment of the color of the final product.

I claim:—

1. The process of producing creosote from wood-tar oils, which comprises treating the oils with an alkaline solution, distilling the resulting solution and partially oxidizing the same during such distillation, and neutralizing and recovering the creosote.

2. The process of producing creosote from wood-tar oils, which comprises treating the oils with an alkaline solution to dissolve only a portion of the phenols present, distilling the resulting solution and partially oxidizing the same during such distillation, and neutralizing and recovering the creosote.

3. The process of producing cresote from wood-tar oils, which comprises treating the oils with an alkaline solution to dissolve only a portion of the phenols present, distilling the resulting solution and partially oxidizing the same during such distillation, neutralizing and recovering the creosote, treating the product with an alkaline solution to completely dissolve the phenols, and distilling with oxidation, neutralizing and recovering the creosote as before.

4. The process of producing creosote from wood-tar oils, which comprises treating the oils with an alkaline solution to dissolve only a portion of the phenols present, distilling the resulting solution, and neutralizing and recovering the creosote.

5. The process of producing creosote from wood-tar oils, which comprises treating the oils with an alkaline solution to dissolve approximately two-fifths of the phenols present, distilling the resulting solution, and neutralizing and recovering the creosote.

6. The process of producing creosote from wood-tar oils, which comprises treating the oils with an alkaline solution to dissolve only a portion of the phenols present, distilling the resulting solution, neutralizing and recovering the creosote, treating the product with an alkaline solution to completely dissolve the phenols, and distilling, neutralizing and recovering the creosote as before.

7. The process of producing creosote from wood-tar oils, which comprises treating the oils with an alkaline solution to dissolve approximately two-fifths of the phenols present, distilling the resulting solution, neutralizing and recovering the creosote, treating the product with an alkaline solution to completely dissolve the phenols, and distilling, neutralizing and recovering the creosote as before.

8. The process of producing creosote from wood-tar oils, which comprises treating the oils with an alkaline solution, distilling the solution and subjecting the mass to oxidation by a current of air during such distillation, and neutralizing and recovering the creosote.

9. The process of producing creosote from wood-tar oils, which comprises treating the oils with an alkaline solution to dissolve only a portion of the phenols present, distilling the solution and subjecting the mass to oxidation by a current of air during such distillation, and neutralizing and recovering the creosote.

10. The process of producing creosote from wood-tar oils, which comprises treating the oils with an alkaline solution to dissolve only a portion of the phenols present, distilling the solution and subjecting the mass to oxidation by a current of air during such distillation, neutralizing and recovering the creosote, treating the product with an alkaline solution to completely dissolve the phenols, and distilling with oxidation by air, neutralizing and recovering the creosote as before.

11. The process of producing creosote from wood-tar oils, which comprises treating the oils with an alkaline solution, distilling the resulting solution and partially oxidizing the same during such distillation, and neutralizing and redistilling to recover the creosote and effecting oxidation during such redistilling.

12. The process of producing creosote from wood-tar, which comprises distilling the tar, removing a portion of the distillate with boiling-points between 195° and 235° C., treating such portion with an alkaline solution to dissolve only a portion of the phenols present, liberating the creosote from the resulting solution and separating it therefrom, and returning the undissolved portion to the tar-distillates.

13. The process of producing creosote from wood-tar oils, which comprises treating the oils with an alkaline solution, distilling the resulting solution and partially oxidizing the same during such distillation, removing the thick tarry material which separates, and neutralizing and recovering the creosote.

14. The process of producing creosote from wood-tar oils, which comprises treating the oils with an alkaline solution, distilling the solution and subjecting the mass to oxidation by a current of air during such distillation, removing the thick tarry material which separates, and neutralizing and recovering the creosote.

In testimony whereof I affix my signature.

LEE F. HAWLEY.